United States Patent
Gittel et al.

(10) Patent No.: US 6,186,199 B1
(45) Date of Patent: Feb. 13, 2001

(54) MILLING TOOL FOR MACHINING WORKPIECES OF WOOD, A DERIVED TIMER PRODUCT, A PLASTIC MATERIAL, ETC.

(75) Inventors: Hans-Jürgen Gittel, Rottenburg (DE); Pascal Wendel, Altenstadt (FR)

(73) Assignee: Ledermann GmbH (DE)

( * ) Notice: Under 35 U.S.C. 154(b), the term of this patent shall be extended for 0 days.

(21) Appl. No.: 09/202,372

(22) PCT Filed: Apr. 2, 1998

(86) PCT No.: PCT/EP98/01911

§ 371 Date: Dec. 11, 1998

§ 102(e) Date: Dec. 11, 1998

(87) PCT Pub. No.: WO98/46402

PCT Pub. Date: Oct. 22, 1998

(30) Foreign Application Priority Data

Apr. 12, 1997 (DE) .......................................... 297 06 589 U
Mar. 12, 1998 (DE) .......................................... 298 04 413 U

(51) Int. Cl.[7] ............................. B27G 13/00; B27G 13/10
(52) U.S. Cl. ......................... 144/228; 144/218; 144/225; 403/408.1; 407/48; 407/103
(58) Field of Search .................... 144/218, 219, 144/224, 225, 228, 230, 235, 236; 407/40, 48, 102, 103; 403/405.1, 408.1, 409.1

(56) References Cited

U.S. PATENT DOCUMENTS

| | | | | |
|---|---|---|---|---|
| 1,071,970 | * | 9/1913 | Stutzman | 144/225 |
| 1,730,714 | * | 10/1929 | Anderson | 144/224 |
| 1,830,128 | * | 11/1931 | Niblock | 144/228 |
| 3,545,060 | * | 12/1970 | Kezran | 407/103 |
| 3,885,282 | * | 5/1975 | Pataky | 407/103 |
| 4,527,930 | * | 7/1985 | Harroun | 407/48 |
| 5,542,793 | * | 8/1996 | Deiss et al. | 407/48 |
| 5,571,250 | * | 11/1996 | Stegmaier | 144/241 |
| 6,000,449 | * | 12/1999 | De Marco | 144/218 |

FOREIGN PATENT DOCUMENTS

| | | |
|---|---|---|
| 2306010 | 9/1973 | (DE) . |
| 91076153 | 12/1991 | (DE) . |
| 93194609 | 6/1994 | (DE) . |
| 94103277 | 12/1994 | (DE) . |
| 4325999 | 2/1995 | (DE) . |
| 29504295 | 8/1995 | (DE) . |
| 29608603 | 9/1996 | (DE) . |
| 0449253 | 10/1991 | (EP) . |

* cited by examiner

*Primary Examiner*—W. Donald Bray
(74) *Attorney, Agent, or Firm*—Robert W. Becker & Associates

(57) ABSTRACT

A milling tool for machining workpieces of wood, derived timber products, plastic material etc., has a support with a receiving portion and a cutting portion. The cutting portion has cutouts with a support surface for receiving at least two exchangeable cutting tips that are connected to the cutouts by at least one screw, respectively. The cutting portion has bores extending from the support surface of the cutouts into the cutting portion. the bores have a threaded portion and a threadless portion. The screws are threaded into the threaded portion of the bores for pressing the cutting tips against the support surface. The cutting tips have receiving openings. The screws have a guide shaft penetrating the receiving opening and extending into the threadless portion that has a tight clearance fit relative to the guide shaft. The screws have a head and the head has a clamping surface extending parallel to the support surface. The guide shaft is arranged adjacent to the clamping surface. The screws have at least one notch positioned adjacent to the guide shaft. The receiving openings are dimensioned such that the guide shaft is received with minimal play. The screws secure cutting tips statically precisely in position and are loaded exclusively by tensile load. Loss of frictional forces between the cutting tips and the cutout results in a maximum displacement of the cutting tips by the minimal play between the guide shaft and the receiving opening. The resulting deformation of the screws occurs in a defined manner in the notch.

22 Claims, 3 Drawing Sheets

MILLING TOOL FOR MACHINING WORKPIECES OF WOOD, A DERIVED TIMER PRODUCT, A PLASTIC MATERIAL, ETC.

BACKGROUND OF THE INVENTION

The invention relates to a milling tool for machining workpieces of wood, a derived timber product, a plastic material etc.

Milling tools with exchangeable cutting tips are known which cutting tips are fastened by one or more screws to the tool base body. The tool base body has for each cutting tip an L-shaped cutout forming the cutting tip seat in which the cutting tip is positioned. The cutting tip rests at the base of the cutout and in this manner is radially secured. A screw is then pushed through a bore provided in the cutting tip and is then screwed into a thread of a bore provided in the tool base body whereby the screw head is pressed against the cutting tip and the cutting tip is pressed against the tool base body.

German Patent DE 43 25 999 describes a tool in the form of a milling tool for metal machining. This tool is substantially formed by a support having a receiving element and cutting tips. A plurality of exchangeable cutting tips are received the cutting portion which are then fixed in position by screws. The cutting portion has a cutout for receiving the cutting tips and the cutouts are provided with bores which extend from the abutment surface into the cutting portion. This bore is designed to receive a screw which is then screwed into a thread for securing the cutting tip against the abutment surface. The screw has a guide shaft which penetrates the receiving opening fo this cutting tip and extends to a portion of the bore within the cutting portion whereby this portion, relative to the guide shaft, has a clearance fit. In this arrangement, the cutting tip rests positive-lockingly at the cutting tip seat of the base body and at the head of the screw so that the manufacturing tolerances of the cutting tip seat and of the screw can be compensated only by a deformation of the screw. This is possible only for relatively low rpm or masses, i.e., kinetic energies of the cutting tips, so that such a system can be realized for metal machining tools but not for wood working tools.

For machining wood, derived timber products or plastic materials, cutting tips of hard metal are preferably used. The blanks for the cutting tips are already provided with the receiving bores for the fastening screws. These blanks for the cutting tips are then centered and subsequently machined so that the ready-to-use state results. During the sintering process the volume of the cutting tip is reduced by up to 20%. This leads also to a change of the shape in the area of the receiving bore. In order to compensate these changes, the dimensions of the receiving bores are provided with course tolerances.

As already mentioned above, the cutting tips are fastened with screws to the tool base body. Due to the bore tolerances of the cutting tips as well as the screw tolerances, a relatively large play results. The fixation of the cutting tips is then achieved by the frictional force applied by the screw head. For this purpose, screws having preferably a semi-spherical head and having a thread size M3 to M4 are used. Such screws can be tightened only with a comparatively minimal torque which results in the frictional force produced by the screw head and the cutting tip surface being relatively small. In order to ensure that during operation of the tool the resulting centrifugal forces will not surpass the magnitude of the frictional force, it is thus possible only to use correspondingly limited cutting velocities. When the resulting centrifugal forces surpass the frictional force, this causes the cutting tips to move radially outwardly or they are even radially accelerated until the edge of the receiving bore will impact the screw shaft. The diameter of the circle described by the cutting tip is thus increased in an undefined manner so that for a tool having multiple cutting tips only one of the cutting edges will be effective, respectively, offset will result for complementing cutting tips.

The present invention has the object to provide a milling tool of the aforementioned kind as mentioned in claim 1 in which the cutting tips are securely held, even at high load and high centrifugal forces, at the cutting portion by a simple design of the fastening means.

SUMMARY OF THE INVENTION

This object is solved by a milling tool for machining workpieces of wood, a derived timber product, a plastic material etc. by the screws having a head with a clamping surface extending parallel to the support surface, wherein the guide shaft is arranged adjacent to the clamping surface, and by the screws having at least one notch positioned adjacent to the guide shaft. The receiving openings are dimensioned such that the guide shaft is received with minimal play. The screws secure the cutting tips statically precisely in position and are loaded exclusively by tensile load. The loss of frictional forces between the cutting tips and the cutouts results in a maximum displacement of the cutting tips by the minimal play between the guide shaft and the receiving opening. The resulting screw deformation occurs in a defined manner in the notch.

The decisive advantage of the invention is to be seen in that the milling tool can fulfill substantially increased requirements with regard to safety and that the cutting velocity can be substantially increased. Upon exchanging the cutting tip it is only necessary to thread the screws and tighten them. An additional position adjustment for achieving profile precision is no longer required.

The inventive milling tool allows for circumferential velocities of up to 80 m/sec. Since the fastening screws no longer load the cutting tips transverse to the longitudinal axis of the screws, the cutting tip is frictionally secured at the receiving portion, so that a bending deformation of the fastening screw is prevented. The fastening screws are only loaded by tensile load. Only when the frictional force is surpassed, for example, due to overloading, the frictional connection is transformed into a positive-locking connection provided by the guide shaft which securely holds the cutting tip in this case.

The screw is provided with at least one notch. Preferably, on either end of the guide shaft one notch is provided. Between the head and the guide shaft an annular notch is thus provided which prevents that notch tension occurs at the transition between the head of the screw and the guide shaft. Because of the arrangement of the guide shaft adjacent to the head, it is ensured that a portion of the guide shaft is positioned within the cutting tip or the support plate. In this manner, tolerances in the radial direction can be minimized. Between a threaded portion of the screw and the guide shaft, an annular notch is provided. Because of this notch between the guide shaft and the threaded portion, an area with increased elasticity results in which the entire deformation due to differently acting forces at the threaded portion and the head can be received. In the case of overloading of the screw, the notch provides a defined and calculatable rated breaking point. Accordingly, the guide shaft, in the case of overloading of the screw in the direction of tensile load, remains securely attached to the head of the screw.

Since preferably the length/diameter ratio of the fit between the guide shaft and the portion of the bore is dimensioned such that upon impacting of transverse forces a wedging of the guide shaft in the bore results, the guide shaft is secured within the bore upon rotation of the milling tool resulting in centrifugal force so that the cutting tip cannot become loose. A sufficient length of the fit between the guide shaft and the respective portion of the bore is provided with an axial extension of the guide shaft within the bore of at least ⅓ of the diameter of the guide shaft.

The receiving opening in the cutting tip has preferably a wall which is perpendicular to the support surface so that the effectiveness of form-locking provides a large surface abutment of the cutting tip at the guide shaft. Furthermore, the receiving opening in the cutting tip is designed such that it has a cross-section at the end facing the head of the screw that in any direction is smaller than the side of the head adjacent to the guide shaft. This ensures that the screw head will rest with a large surface area on the plane about the receiving opening of the cutting tip. The cross-sectional shape of the receiving openings can be circular or a slotted hole.

The receiving opening in the cutting tip is preferably sized or positioned such that in the radial direction of the cutting tip relative to the guide shaft a maximum play of approximately 0.2 mm will result. This ensures that even for overcoming the frictional force between the cutting plate and an abutment surface of the receiving opening in the cutting portion the circle described by the cutting edge is only increased by a maximum of 0.4 mm. A further movement in the radial direction is completely prevented.

In order to provide sufficient elasticity in the area of the annular notch between the threaded portion and the guide shaft, it is expedient that the depth of the notch is approximately 10% of the diameter of the guide shaft and the axial length of the notch is approximately 30% of the diameter.

According to a further embodiment of the invention, between the support surface and the cutting tip a support plate is provided having a contour that preferably matches in the area of the cutting profile at least substantially the shape of the cutting tip.

In a preferred embodiment the shape of the outer contour of the cutting portion can be matched substantially to the shape of the cutting edge of the cutting tip. The base surface for supporting the cutting tip at its radially inwardly positioned end has preferably two support locations, however, the base surface can also be planar. For producing certain profiles, it is expedient to arrange two cutting tips alternatingly such that the profiles of the cutting tips will complement one another to the desired profile.

Especially for support portions of aluminum material, a threaded insert of a material that can withstand greater loading may be provided for increasing the stiffness of the inner thread within the cutting portion. Such a threaded insert is preferably a spring coil insert as is known by the commercial name HELICOIL. Such a coil spring insert is comprised of cold-rolled smooth profile wire of a highly stable CrNi steel.

BRIEF DESCRIPTION OF THE DRAWINGS

One embodiment of the inventive milling tool will be explained in more detail in the following with the aid of the drawing. The drawing shows in.

DESCRIPTION OF PREFERRED EMBODIMENTS

Figure 1:
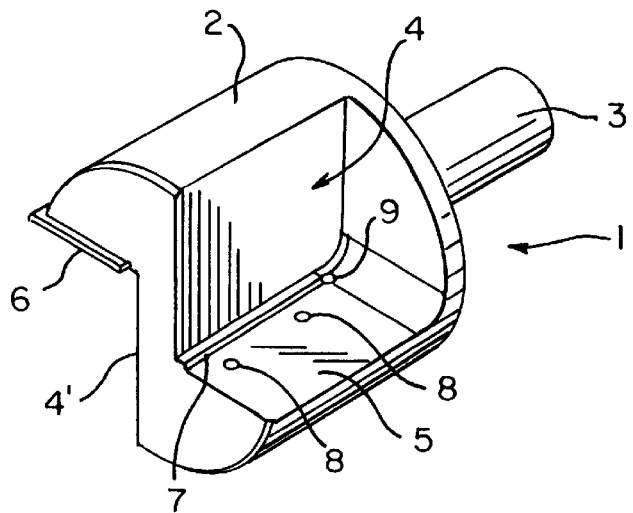
FIG. 1 a perspective view of a support portion.

In FIG. 1 a support 1 is represented that comprises a cutting portion 2 and the receiving portion 3. The cutting portion 2 has substantially the outer contour of a cylinder with cutouts 4, 4' which are delimited by surfaces extending substantially at a right angle to one another. The cutouts 4, 4' have respectively a support surface 5 for a cutting tip 6 whereby in FIG. 1 only the cutout 4' with coordinated cutting tip 6 is represented. In the cutout 4 the cutting tip has been omitted in order to show the support surface 5 as well as of the base surface 7 positioned at its radially inner end as well as the bores 8 and the abutment elements 9. The abutment element 9 serves for determining the cutting tip position in the axial direction, whereby the base surface 7 provides a radial abutment for the cutting tip. The bores 8 extending from the abutment surface 5 into the body of the cutting portion 2 is preferably provided with a thread and are adapted to receive the fastening screws which press the cutting tip against the support surface 5 of the cutting portion 2.

Figure 2:
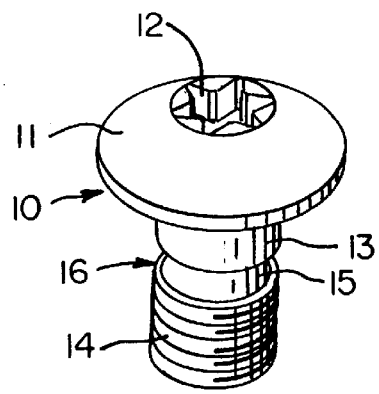
FIG. 2 an enlarged representation of a fastening screw.

FIG. 2 shows a screw 10 for fastening the cutting tips at the cutting portion of a support whereby the screw 10 for ease of representation is shown in a greatly enlarged scale. The screw 10 has a head 11 which is lens-shaped and has an end face opening 12 for engagement of a screw driver for mounting or demounting of the cutting tip. Adjacent to the head 11 a guide shaft 13 is provided having a certain axial length and having positioned adjacent thereto a threaded portion 14. Between the threaded portion 14 and the guide shaft 13 an annular notch 15 is provided by which between the guide shaft 13 and the threaded portion 14 an area 16 is provided which due to its elasticity can receive deformations due to different force impact on the head 11 and the threaded portion 14. The threaded portion 14 is expediently provided with a thread of the size M3 to M5.

Figure 3:
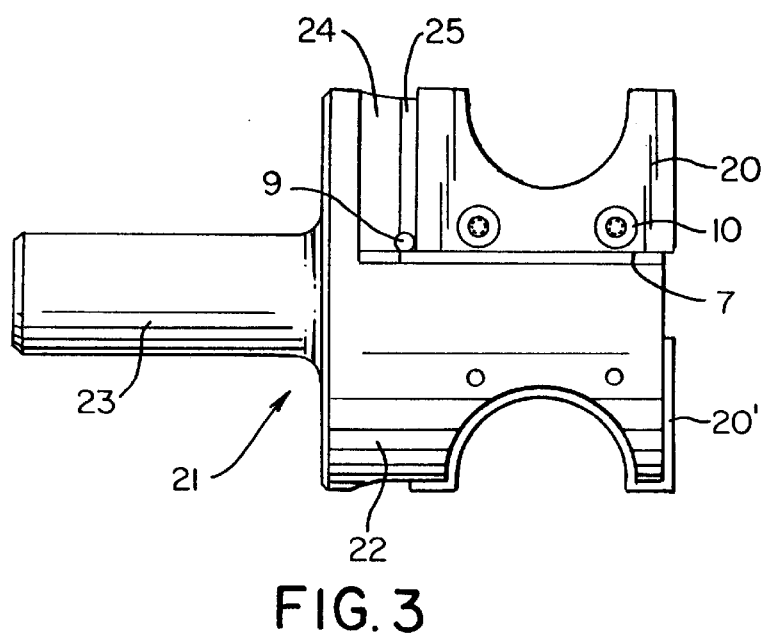
FIG. 3 a side view of a milling tool with profiled cutting portion.

FIG. 3 shows a side view of a support 21 provided with two cutting tips 20, 20' that comprises a receiving part 23 and also a cutting portion 22 as disclosed in the embodiment above. The cutting portion 22 has a profiling matching the profiling of the cutting tips 20, 20' so that the cutting tips 20, 20' project only with the cutting edge from the contour of the cutting portion 22. At the lower part of the cutting portion 22 rear openings of the bores 8 are visible. At the upper area of the cutting portion 22 a cutout 24 with a support surface 25 for supporting the cutting tip 20 is provided. The cutting tip 20 is positioned with its radially inner border at the base surface 7 and, for axial positioning, rests with its left side at the abutment element 9. The cutting tip 20 is fastened by screws 10 to the cutting portion 22 whereby the screws 10 correspond to the one explained in detail in relation to FIG. 2.

Figure 4:
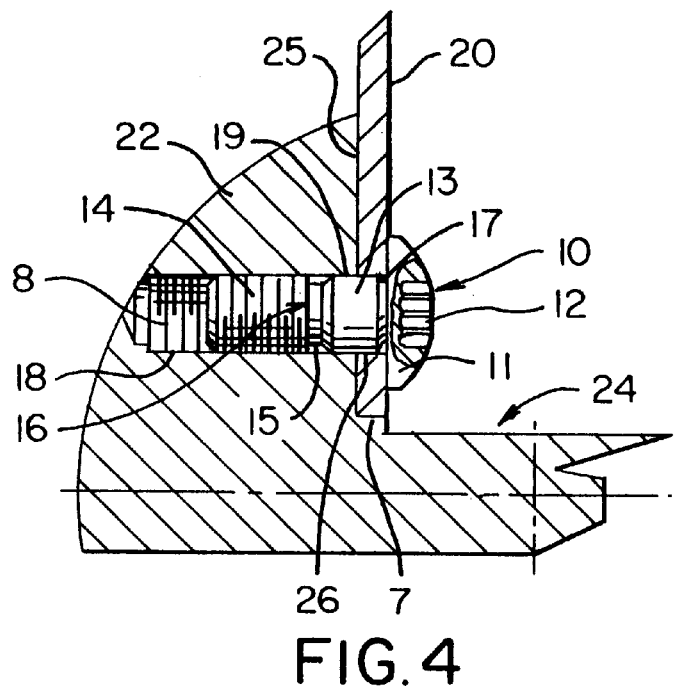
FIG. 4 a portion of a sectional representation of the support with mounted cutting tip.

FIG. 4 shows a partial section of the cutting portion 22. This shows that the bore 8 is provided with an inner thread 18. The support surface 25 has positioned adjacent thereto a section 19 of the bore 8 with a smooth inner wall which provides a tight clearance fit for the guide shaft 13 provided at the screw 10. As an example for a preferred clearance fit for the portion 19 and the guide shaft 13 the pairing H7/e8 is suggested. However, other clearance fit combinations are also possible. Between the threaded portion 14 and the guide shaft 13 the area 16 formed by the radial notch 15 is positioned. Between the head 11 of the screw 10 and the guide shaft 13 an annular notch 17 is provided. The cutting tip 20 has a receiving opening 26 through which the screw 10 is guided. The guide shaft 13 is positioned within the opening 26 and projects at least over more than half of the thickness of the cutting tip 20 into it. The opening 26 has only a minimal radial play to the guide shaft 13 which is, for example, 0.2 mm but it may also be a play of 0.5 mm. Smaller tolerances are not possible because of the great shrinkage of the material during the sintering process.

By threading the screw 10 into the thread 18 of the bore 8, the head 11 with its flat side facing the cutting tip 20 will come to rest at the cutting tip 20 and will press it against the support surface 25. Accordingly, the screw head 11 provides a great pressing force onto the cutting tip 20 or the support surface 25 that is greater than the ;centrifugal force acting on the cutting top 20 as a result of the rotation of the support. When the centrifugal force surpasses the frictional force provided by the screw 10 between the support surface 25 and the cutting tip 20, the cutting tip 20 can only be radially moved by the amount of the minimal play between the edge of the opening 26 and the guide shaft. A further radial movement of the cutting tip 20 is reliably prevented in that the guide shaft 13 is positioned with tight clearance fit within the portion 19 of the bore 8 so that a deflection of the screw 10 relative to its longitudinal axis is prevented even for great radial forces. This is so because the radial forces acting on the cutting tip 20 will produce a clamping force of the guide shaft 13 in the portion 19 of the bore 8 which will prevent loosening of the screw 10 even in the case when the screw 10 will break in the area 16 due to overload.

Figure 5:
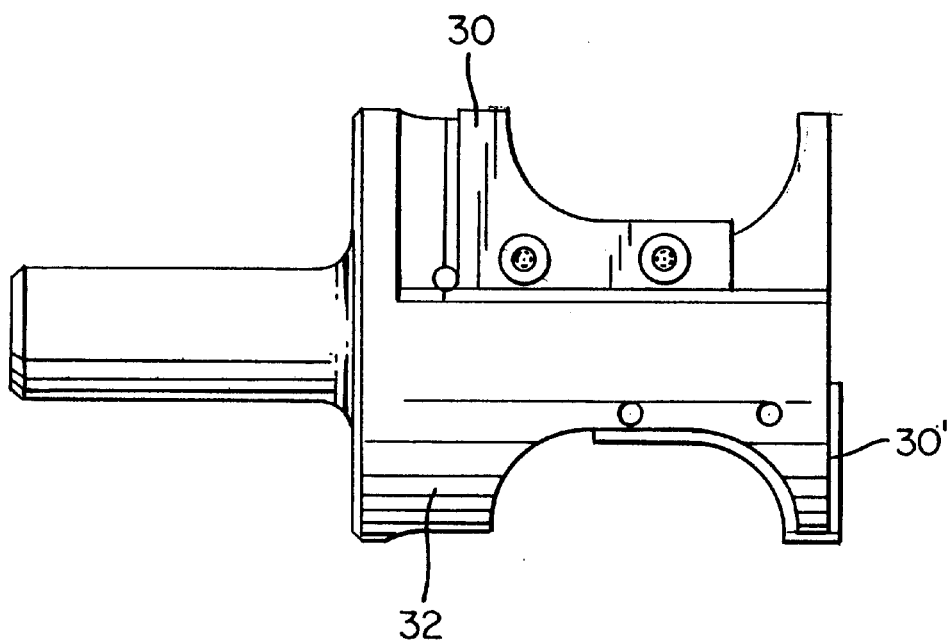
FIG. 5 a representation of a milling tool in which the cutting tips complement one another to a profile.

FIG. 5 shows an embodiment variant of the milling tool in which two cutting tips 30, 30' arranged with offset in the axial direction are provided at a cutting portion 32 and fastened thereto by screws 10. The two cutting tips 30, 30' provide together a profile to be produced, i.e., the two cutting tips 20, 20' complement each other to the desired contour which the workpiece is to have after machining by the milling tool.

Figure 6:
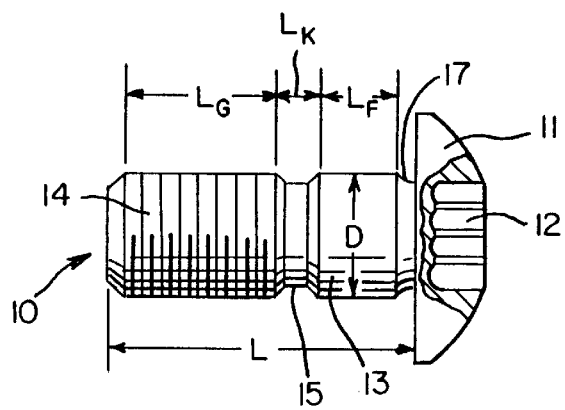
FIG. 6 an enlarged representation of a side view of the fastening screw.

FIG. 6 shows the screw 10 in a side view in an enlarged representation. This shows that the axial length $L_G$ of the threaded portion 14 corresponds approximately to half the length L of the threaded bolt formed by the guide shaft 13 and the threaded portion 14 including the two notches 15 and 17. The axial length $L_F$ of the guide shaft 13 is substantially smaller in comparison whereby the ratio of length $L_F$ to diameter D of the guide shaft 13 is approximately 1:2. The axial extension of the guide shaft 13 within the portion 19 of the bore 8 should be at least ⅓ of the diameter D of the guide shaft. The depth of the notch 15 is a maximum of 10% of the diameter D of the guide shaft and the axial length $L_K$ of the notch 15 is approximately 30% of the diameter D.

Figure 7:
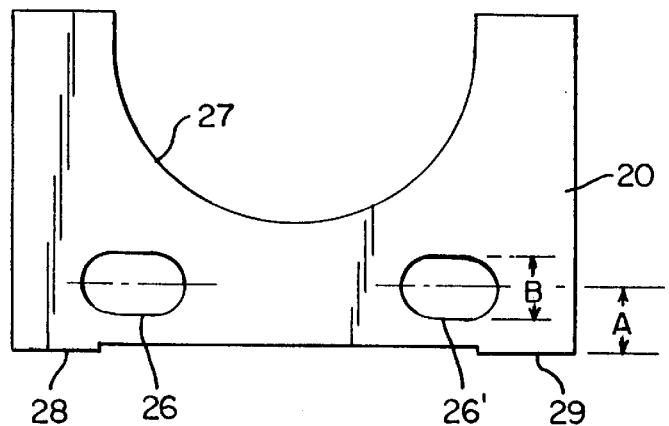
FIG. 7 a cutting tip as an individual part.

In FIG. 7, the cutting tip 20 is shown as an individual part. This cutting tip 20 has a substantially semi-circular cutting edge profile 27 so that with this cutting tip 20 the entire profile can be produced. According to the arrangement of bores within the cutting portion, the cutting tip 20 has two receiving openings 26, 26' having opening cross-sections in the centrifugal force direction closely watching the diameter of the guide shaft of the screws provided for fastening the cutting tip to the cutting portion. These openings 26, 26' are represented in FIG. 7 as slotted holes whereby the extension B corresponds to the width in the centrifugal direction.

At the edge of the base surface of the cutting portion the cutting tip 20 is provided with two spaced-apart abutment surfaces 28, 29. The central axis of the openings 26, 26' extend at a spacing A to the bearing surfaces 28, 29. For the cutting tip 20 the dimensions A and B can be substantially selected with more narrow tolerances whereby the tolerances are now in the range of ±0.05 mm.

Figure 8:
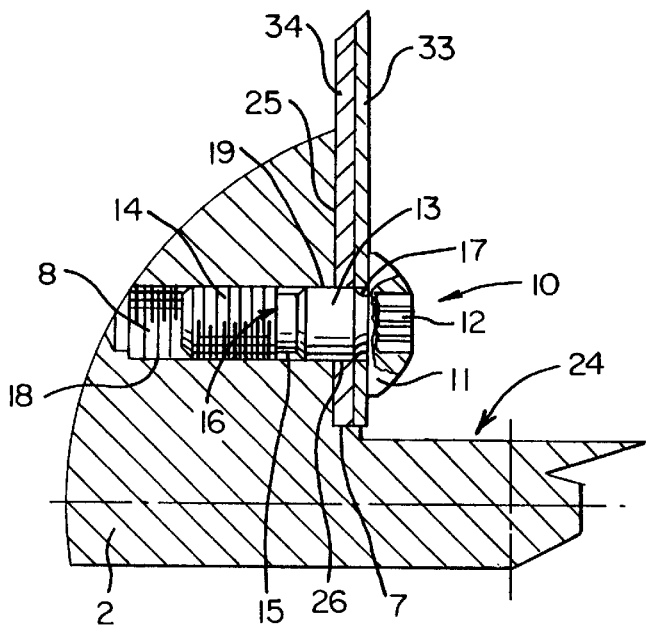
FIG. 8 a variant of the embodiment of FIG. 4.

FIG. 8 shows a variant of FIG. 4 in which the cutting portion 2 is designed as shown in FIG. 1. In the cutout 24 a cutting tip 33 is supported on the support surface 25 by a support plate 34 whereby the support plate 34 has a contour that matches at least substantially the shape of the cutting tip. This matched shape should be provided especially in the area of the cutting edge. The purpose of this embodiment is to provide the cutting portion 2 with different profiles without having to change the cutting portion itself. Since the cutting tips with small profiles are very brittle, a supporting action is provided which is in the form of support plate 34. The support plate 34 is attached in the same manner to the cutting portion 2 as disclosed in connection with the cutting top 20 of FIG. 4.

In the above FIGS. 1, 3 and 5, the receiving portion 3, respectively, 23 is a shaft. Alternatively, the receiving portion at the cutting portion 2 can also be in the form of a central bore so that the support 1, 21 can be placed onto a machine spindle.

The specification incorporates by reference the entire disclosure of German priority documents 297 06 589.0 of Apr. 12, 1997, and 298 04 413.7 of Mar. 12, 1998 as well as of International Application PCT/EP98/01911 of Apr. 2, 1998.

The present invention is, of course, in no way restricted to the specific disclosure of the specification and drawings, but also encompasses any modifications within the scope of the appended claims.

What is claimed is:

1. A milling tool for machining workpieces of wood, a derived timber product, or a plastic material, said milling tool comprising:

a support (1, 21) comprising a receiving portion (3, 23) and a cutting portion (2, 22);

at least two exchangeable cutting tips (6, 20, 20', 30, 30', 33);

said cutting portion (2, 22) having cutouts (4, 4', 24) with a support surface (5, 25) for receiving said cutting tips (6, 20, 20', 30, 30', 33);

said cutting tips (6, 20, 20', 30, 30', 33) connected to said cutouts (4, 4', 24) of said cutting portion (2, 22) by at least one screw (10), respectively;

said cutting portion (2, 22) having bores (8) extending from said support surface (5, 25) of said cutouts (4, 4', 24) into said cutting portion (2, 22);

said bores (8) comprising a threaded portion (18) and a threadless portion (19);

said screws (10) threaded into said threaded portion of said bores (18) for pressing said cutting tips (6, 20, 20', 30, 30', 33) against said support surface (5, 25);

said cutting tips (6, 20, 20', 30, 30', 33) having receiving openings (26, 26');

said screws (10) having a guide shaft (13) penetrating said receiving opening (26, 26') of said cutting tips (6, 20, 20', 30, 30', 33) and extending into said threadless portion (19), whereby said threadless portion (19) has a tight clearance fit relative to said guide shaft (13);

said screws (10) having a head (11) and said head (11) having a clamping surface (11') extending parallel to said support surface (5, 25);

said guide shaft (13) arranged adjacent to said clamping surface (11');

said screws (10) having at least one notch (15, 17) positioned adjacent to said guide shaft (13);

said receiving openings (26, 26') dimensioned such that said guide shaft (13) is received with minimal play;

said screws (10) securing said cutting tips (6, 20, 30, 33) statically precisely in position and loaded exclusively by tensile load;

wherein loss of frictional forces between said cutting tips (6, 20, 30, 33) and said cutouts (4, 4', 24) results in a maximum displacement of said cutting tips (6, 20, 30, 33) by said minimal play between said guide shaft (13) and said receiving opening (26, 26') and wherein the resulting deformation of said screws (10) occurs in a defined manner in said notch (15, 17).

2. A milling tool according to claim 1, wherein first one of said notches (17) is positioned between said head (11) and said guide shaft (13) and wherein a second one of said notches (15) is positioned between said guide shaft (13) and a threaded portion (14) of said screw (10).

3. A milling tool according to claim 2, wherein said second notch (15) is an annular notch having a depth of at most 10% of a diameter (D) of said guide shaft (13) and having an axial length ($L_K$) of approximately 30% of said diameter (D) of said guide shaft (13).

4. A milling tool according to claim 1, wherein said receiving opening (26, 26') has a circular or slotted hole-shaped cross-section and wherein said receiving opening (26, 26') has a wall extending perpendicularly to said support surface (25).

5. A milling tool according to claims 17, wherein said receiving opening (26, 26') has an end facing said head (11), wherein said end has a cross-section that is smaller than said clamping surface (11') of said head (11).

6. A milling tool according to claim 1, wherein a the length/diameter ratio of said clearance fit between said guide shaft (13) and said threadless portion (19) is such that for a deformation of said screw (10) by action of transverse forces wedging of said guide shaft (13) in said bore (8) will result.

7. A milling tool according to claim 1, wherein an axial length of said guide shaft (13) within said bore (8) is at least ½ of a diameter (D) of said guide shaft (13).

8. A milling tool according to claim 1, wherein said receiving opening (26, 26') has a maximum play of approximately 0.2 mm in a radial direction relative to said guide shaft (13).

9. A milling tool according to claim 1, wherein said cutout (4, 4', 24) has a base surface (7) having two abutment locations for said cutting tip (20, 20').

10. A milling tool according to claim 1, wherein said cutout (4, 4', 24) has a planar base surface (7) for receiving said cutting tip (20, 20').

11. A milling tool according to claim 1, wherein two of said cutting tips (30, 30' are arranged alternatingly such that profiles of said cutting tips (30, 30') complement one another.

12. A milling tool according to claim 1, wherein said cutout (4, 4') has a base surface (7) providing a radial abutment for said cutting tip (6, 20, 20', 30, 30', 33) and has an abutment element (9) for axially positioning said cutting tip (6, 20, 20').

13. A milling tool according to claim 1, further comprising support plates (34) positioned between said support surfaces (5, 25) and said cutting tips (20).

14. A milling tool according to claim 1, wherein a contour of said support plates (34) matches substantially a shape of said cutting tip (33).

15. A milling tool according to claim 1, wherein a contour of said support plates (34) matches substantially a shape of said cutting portion.

16. A milling tool according to claim 1, wherein a contour of said support plates (34) matches substantially a shape of said cutting tip (33) and of said cutting portion.

17. A milling tool according to claim 1, wherein said threaded portion (18) is embodied by a threaded insert.

18. A milling tool according to claim 17, wherein said threaded insert is a spring coil insert made of cold-rolled, smooth profile wire of a high-strength CrNi steel.

19. A cutting tip comprised of a base plate having at least one receiving opening (26, 26') positioned in a direction of centrifugal force action and having an inner width (B) wherein said inner width (B) has a tolerance of a maximum of 0.2 mm.

20. A cutting tip according to claim 19, wherein said tolerance of said inner width (B) is approximately ±0.05 mm.

21. A cutting tip according to claim 19, further comprising at least one abutment surface (28, 29), wherein a center axis of said at least one receiving opening (26, 26') is positioned at a spacing (A) to at least one of said abutment surfaces (28, 29), wherein said spacing (A) has a tolerance of at most 0.2 mm.

22. A cutting tip according to claim 21, wherein said tolerance of said spacing (A) is approximately ±0.05 mm.

* * * * *